US009485181B2

(12) United States Patent
Abbas et al.

(10) Patent No.: US 9,485,181 B2
(45) Date of Patent: *Nov. 1, 2016

(54) DYNAMIC BANDWIDTH ADJUSTMENT IN PACKET TRANSPORT NETWORK

(71) Applicant: Telefonaktiebolaget L M Ericsson (publ), Stockholm (SE)

(72) Inventors: Ghani Abbas, Nottingham (GB); Scott Mansfield, Evans City, PA (US)

(73) Assignee: TELEFONAKTIEBOLAGET LM ERICSSON (PUBL), Stockhom (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/000,366

(22) Filed: Jan. 19, 2016

(65) Prior Publication Data

US 2016/0142319 A1 May 19, 2016

Related U.S. Application Data

(63) Continuation of application No. 14/581,017, filed on Dec. 23, 2014, now Pat. No. 9,264,345, which is a continuation of application No. 13/493,039, filed on Jun. 11, 2012, now Pat. No. 8,953,440.

(60) Provisional application No. 61/560,187, filed on Nov. 15, 2011.

(51) Int. Cl.
*H04L 12/26* (2006.01)
*H04L 12/803* (2013.01)
(Continued)

(52) U.S. Cl.
CPC ......... *H04L 47/122* (2013.01); *H04L 41/0654* (2013.01); *H04L 45/125* (2013.01);
(Continued)

(58) Field of Classification Search
None
See application file for complete search history.

(56) References Cited

U.S. PATENT DOCUMENTS 6,947,377 B1   9/2005   Shimano et al.
7,974,187 B2   7/2011   Yamauchi
(Continued)

FOREIGN PATENT DOCUMENTS

| CN | 1765087 A | 4/2006 |
|----|-----------|--------|
| CN | 101540710 A | 9/2009 |
| EP | 1223713 A2 | 7/2002 |

OTHER PUBLICATIONS

International Telecommunication Union, ITU-T, G.808.1, Telecommunication Standardization Sector of ITU, Series G: Transmission Systems and Media, Digital Systems and Networks; Digital networks—General aspects; "Generic protection switching—Linear trail and subnetwork protection"; ITU-T Recommendation G.808.1; Dec. 2003; pp. 1-66; Geneva, Switzerland.

(Continued)

*Primary Examiner* — Chi H Pham
*Assistant Examiner* — Fahmida Chowdhury
(74) *Attorney, Agent, or Firm* — Patent Portfolio Builders PLLC (57) ABSTRACT

A method for adjusting bandwidth in a communications network having a plurality of nodes connected over multiple links with a plurality of services running on the links includes detecting an impairment of a link wherein the impairment invokes a reduction in bandwidth available to the services running on the link, communicating information about the impairment to other nodes in the network and redistributing services between the links to limit a bandwidth required by services running on the impaired link to a value not exceeding the bandwidth available on the impaired link.

20 Claims, 9 Drawing Sheets

(51) Int. Cl.

| | | |
|---|---|---|
| *H04L 12/911* | (2013.01) | |
| *H04L 12/923* | (2013.01) | |
| *H04L 12/729* | (2013.01) | |
| *H04L 12/707* | (2013.01) | |
| *H04L 12/24* | (2006.01) | |
| *H04L 12/851* | (2013.01) | |
| *H04W 28/02* | (2009.01) | |

(52) U.S. Cl.
CPC ............ *H04L 45/22* (2013.01); *H04L 47/125* (2013.01); *H04L 47/2408* (2013.01); *H04L 47/746* (2013.01); *H04L 47/762* (2013.01); *H04W 28/0284* (2013.01)

(56) References Cited

U.S. PATENT DOCUMENTS

| | | | |
|---|---|---|---|
| 2007/0076688 A1* | 4/2007 | Fuss .................... | H04L 12/5692 370/352 |
| 2008/0002676 A1 | 1/2008 | Wiley et al. | |
| 2008/0291927 A1 | 11/2008 | Yong et al. | |
| 2009/0141621 A1 | 6/2009 | Fan et al. | |
| 2009/0196172 A1 | 8/2009 | Long | |
| 2009/0238067 A1* | 9/2009 | Yamauchi ........... | H04L 12/4013 370/228 |
| 2011/0164501 A1 | 7/2011 | Dunbar | |
| 2011/0261695 A1 | 10/2011 | Zhao et al. | |

OTHER PUBLICATIONS

International Telecommunication Union, ITU-T, G.8032/Y.1344; Telecommunication Standardization Sector of ITU; Series G: Transmission Systems and Media, Digital Systems and Networks; Packet over Transport aspects—Ethernet over Transport aspects; Series Y: Global Information Infracstructure, Internet Protocol Aspects and Next-Generation Networks, Internet protocol aspects—Transport; "Ethernet ring protection switching"; Recommendation ITU-T G.8032/Y.1344, pp. 1-104.

International Telecommunication Union, Telecommunication Standardization Sector, Series Y: Global Information Infrastructure, Internet Protocol Aspects and Next-Generation Networks, OAM functions and mechanisms for Ethernet based networks, Recommendation ITU-T Y.1731, Feb. 2008, Geneva, Switzerland.

International Telecommunication Union, Telecommunication Standardization Sector, Series G: Transmission Systems and Media, Digital Systems and Networks, Series Y: Global Information Infrastructure, Internet Protocol Aspects and Next-Generation Networks, OAM functions and mechanisms for Ethernet based networks, Recommendation ITU-T G.8013/Y.1731, Jul. 2011, Geneva, Switzerland.

International Search Report issued in corresponding International application No. PCT/EP2012/072252, date of mailing Feb. 14, 2013.

Busi et al., "Operations, Administration and Maintenance Framework for MPLS-based Transport Networks, draft-ietf-mpls-tp-oam-framework-09.txt", MPLS Working Group, Internet Draft, Oct. 7, 2010, pp. 1-57.

Shaikh, A. et al., "Evaluating the Overheads of Source-Directed Quality-Of-Service Routing;" Network Protocols, 1998 Proceedings; Sixth International Conference, Austin, TX, USA.

Search Report from the State Intellectual Property Office of People's Republic of China in corresponding Chinese Application No. 2012800056206.5 dated Jan. 23, 2016.

Office Action from the State Intellectual Property Office of People's Republic of China in corresponding Chinese Application No. 2012800056206.5 issued Feb. 2, 2016.

* cited by examiner

DYNAMIC BANDWIDTH ADJUSTMENT IN PACKET TRANSPORT NETWORK

RELATED APPLICATIONS

This application is a continuation of U.S. patent application Ser. No. 14/581,017 filed on Dec. 23, 2014, which is a continuation of U.S. patent application Ser. No. 13/493,039 filed on Jun. 11, 2012, entitled "Dynamic Bandwidth Adjustment in Packet Transport Network", now U.S. Pat. No. 8,953,440, which is related to, and claims priority from, Provisional Patent Application No. 61/560,187 filed on Nov. 15, 2011, the subject matter of which is incorporated in its entirety herein by reference.

TECHNICAL FIELD

The present invention relates generally to telecommunications networks and, more particularly to, methods, devices and networks for load sharing in networks with variable link bandwidth.

BACKGROUND

Figure 1:
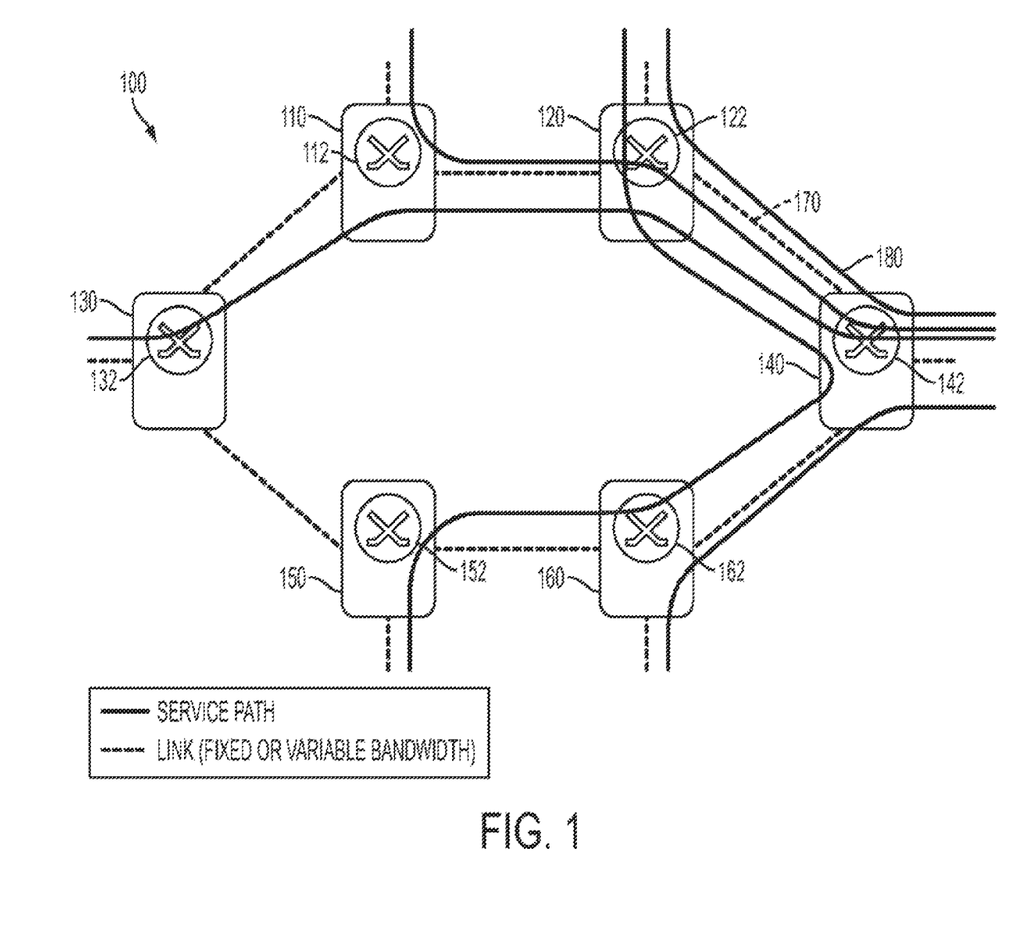
FIG. 1 illustrates a network with variable link capacity.

As link bandwidth affect the transmission capacity, variable transmission capacity presents a problem in networks in terms of ensuring the throughput for which the network is designed. From a mobile backhaul application point of view, this becomes particularly important at places in the network with a high amount of aggregated traffic or when ring or mesh topologies are deployed due to geographical and resiliency considerations (i.e. unreliable transmission media, etc.). A network 100 with variable link capacity is illustrated in FIG. 1. Network 100 includes nodes 110, 120, 130, 140, 150 and 160 (having corresponding switches 112, 122, 132, 142, 152 and 162) and variable or fixed bandwidth links 170 between the various nodes. Service paths 180 may be established over at least some of the links 170.

At present, the main packet transport networks are Ethernet and MPLS (Multi Protocol Label Switching). However, new technologies such as MPLS-TP (Transport Profile) are likely to be deployed in telecommunications transport networks. These technologies are generally clients of the physical transport layers which could be copper, ether or optical fiber. In networks that utilize microwave links for transport of Ethernet or MPLS packets, degradation due to environmental conditions or other impairments could result in loss of traffic on the microwave links.

New packet transport technologies are also being deployed over the physical layers such as fiber, copper or Ether. In microwave transport networks, degradation on microwave links can result in catastrophic loss of services. Existing solutions use protection switching where redundancies of these microwave links are deployed. However, this is an expensive solution.

Figure 2:
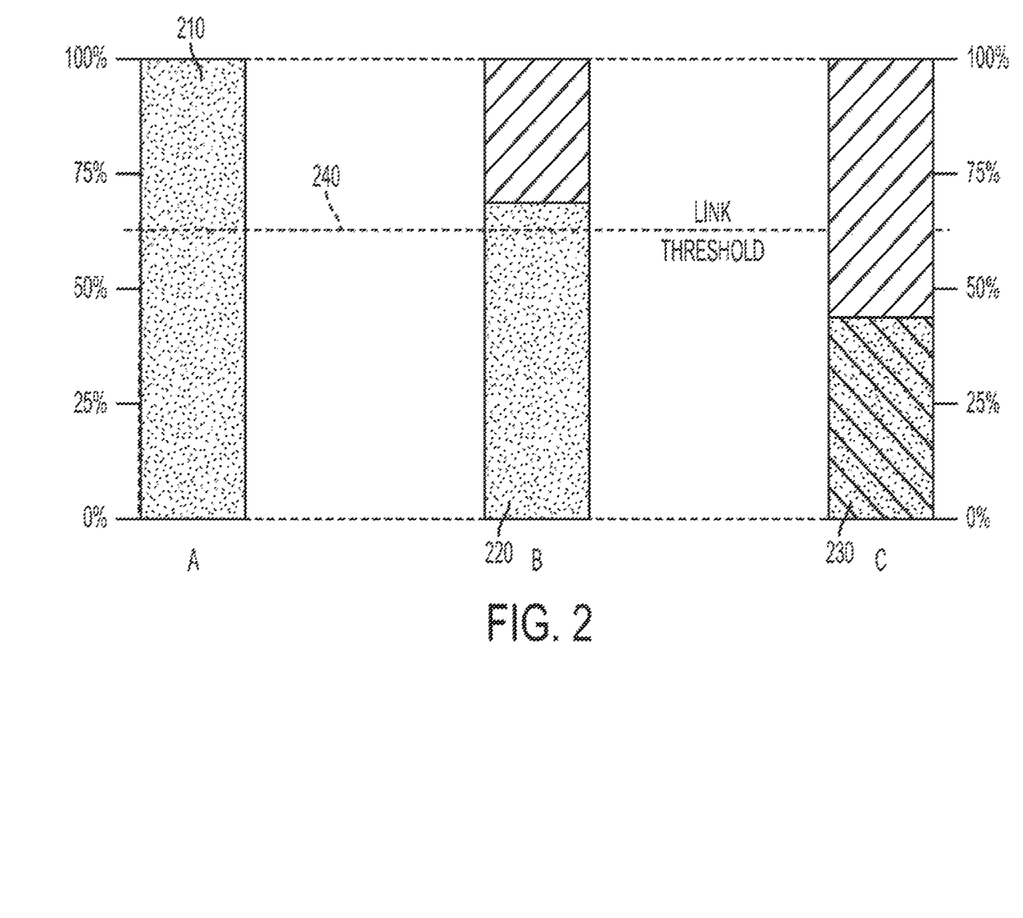
FIG. 2 illustrates a static service allocation with pre-defined threshold values.

Several technologies operating on variable link bandwidth networks do not take full advantage of the offered bandwidth. The links are often dimensioned for a guaranteed bandwidth which is a threshold for the availability of the entire link. If the threshold is exceeded, the link is made inoperable and will not be used for user traffic. Such static service allocation is illustrated in FIG. 2.

A link threshold 240 for guaranteed service may be pre-determined (corresponding approximately to 62.5% in this exemplary scenario). In state 210, the full bandwidth is available (i.e. greater than the 62.5% threshold) for the services allocated on the link. Therefore, no problems are encountered. In state 220, the link bandwidth has decreased to approximately 65% (still greater than the threshold) and some bandwidth is not available (35%). In this state, less bandwidth is made available to the best effort services (i.e. not guaranteed service) and best effort end-users can potentially experience a slower connection (i.e. service degradation). Guaranteed service end-users can still be provided service.

In state 230, the link bandwidth has decreased to a level where it is not possible to sustain the guaranteed services (i.e. less than 62.5%). As the services compete for the same resources, they could potentially all experience service degradation or even a service break down. Since it is not possible to operate in this state, the link can be shut down. A command signal needs to be sent to all services to take an alternate route. Transmitting such a signal may not always be possible as bandwidth may not be available to cater for extra bandwidth needed by the service.

A need exists, therefore, for facilitating a desirable throughput solution directed to networks having links with variable capacity.

SUMMARY

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof.

In accordance with an exemplary embodiment, a method for adjusting bandwidth in a communications network with a plurality of nodes connected over multiple links and having a plurality of services running on the links is disclosed. The method comprises: detecting an impairment of a link, the impairment causing a reduction in bandwidth available to the services running on the link; communicating information about the impairment to other nodes in the network; and redistributing services between the links to limit a bandwidth required by services running on the impaired link to a value not exceeding the bandwidth available on the impaired link.

In accordance with another exemplary embodiment, a node in a communication network is disclosed. The network includes a plurality of nodes connected over multiple links and a plurality of services running on the links. The node comprises: an impairment detection module for detecting an impairment in a link used by the node, the impairment invoking a reduction in bandwidth available to the services running on the link; a communication interface for communicating information about the impairment to other nodes in the network; and an impairment resolution module for redistributing services between the impaired link and at least one other link.

BRIEF DESCRIPTION OF THE DRAWINGS

The objects and advantages of the invention will be understood by reading the following detailed description in conjunction with the drawings in which.

DETAILED DESCRIPTION

The various features of the invention will now be described with reference to the figures, in which like parts are identified with the same reference characters or numerals.

The various aspects of the invention will now be described in greater detail in connection with a number of exemplary embodiments. To facilitate an understanding of the invention, many aspects of the invention are described in terms of sequences of actions to be performed by elements of a computer system or other hardware capable of executing programmed instructions. It will be recognized that in each of the embodiments, the various actions could be performed by specialized circuits (e.g., analog and/or discrete logic gates interconnected to perform a specialized function), by one or more processors programmed with a suitable set of instructions, or by a combination of both. The term "circuitry configured to" perform one or more described actions is used herein to refer to any such embodiment (i.e., one or more specialized circuits and/or one or more programmed processors).

Moreover, the invention can additionally be considered to be embodied entirely within any form of computer readable carrier, such as solid-state memory, magnetic disk, or optical disk containing an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiments as described above may be referred to herein as "logic configured to" perform a described action, or alternatively as "logic that" performs a described action.

According to exemplary embodiments, the outcome of the static service allocation (as described above) may be improved by establishing control over the services that should be sustained on a link during bandwidth decrease. Some of the services on the link can be blocked and redistributed to other paths through the network in some embodiments. The services on the link can even be blocked without redistribution in some embodiments. As a result of the blocking and redistribution, bandwidth may be freed to facilitate better support for the services still allocated on the link (or for those services sharing path with the blocked service). The redistributable service allocation according to exemplary embodiments can facilitate operation below the pre-determined threshold such as state 230 of FIG. 2.

In exemplary embodiments where a network is configured to redistribute the traffic to alternate paths, the correlation in the bandwidth variation between the different links (i.e. "original" and alternate) is evaluated. Redistribution of traffic between links that experience the same (or similar) physical conditions may not provide same level of performance or resiliency as redistribution over links with diverse physical conditions.

Load sharing methods according to exemplary embodiments may utilize several paths between nodes and can facilitate operation at lower bandwidths. The availability requirements on the guaranteed traffic per link can be reduced.

Exemplary embodiments may be applicable to those variations that are too long to be buffered but not long enough to drive the dimensioning of the network. The redistribution of services has to be completed in a timely manner such that an end-user's quality of experience (QoE) is not affected or diminished.

Figure 3:
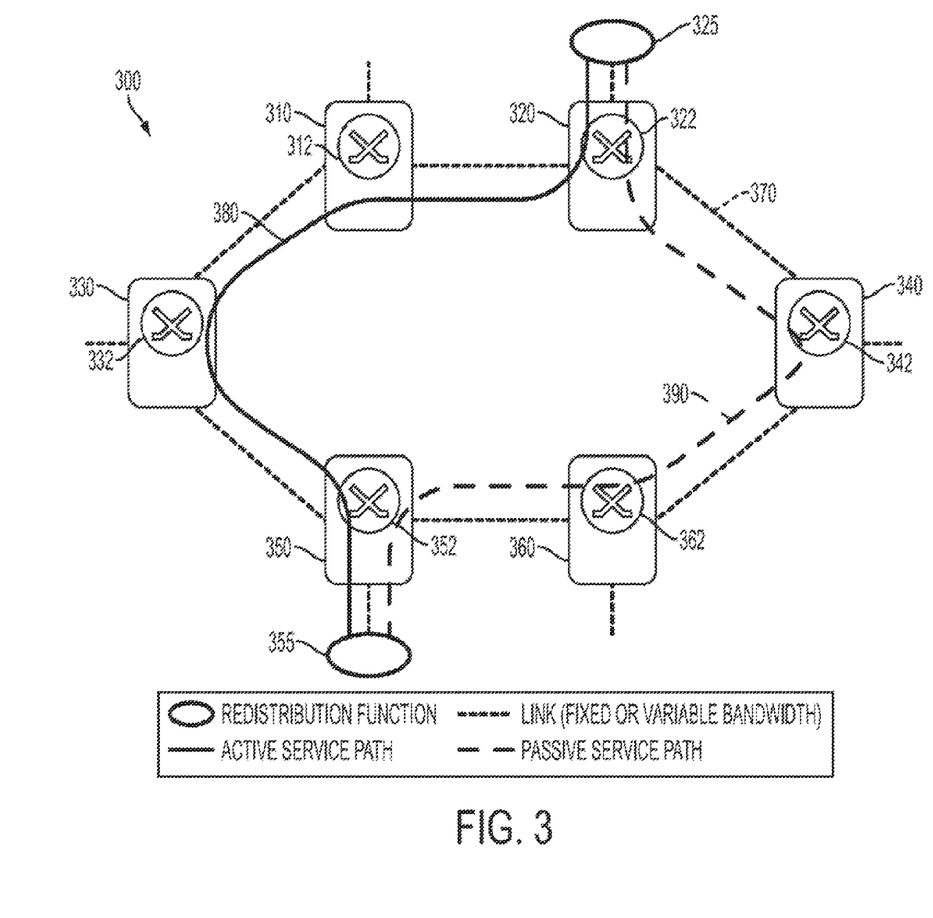
FIG. 3 illustrates a network having a service redistribution function in accordance with exemplary embodiments.

In order to offer a timely response to link bandwidth variations affecting a service path, a protective switching analogy may be used. An exemplary network (or a portion thereof) is illustrated in FIG. 3. Network 300 may include a plurality of nodes 310, 320, 330, 340, 350 and 360 (with corresponding switches 312, 322, 332, 342, 352 and 362). Network 300 may also include a plurality of links 370 between the nodes. In the illustrated example, two distribution functions 325 and 355 (one at each of nodes 320 and 350 respectively) are included.

Preconfigured service paths 380 and 390 may be setup between the service redistribution functions (via the links). The pre-configuration may take place during network dimensioning. The actual path used 380 (referred to as the "active" path for example) may be determined by the redistribution functions 325 and 355 through active monitoring of the connectivity over the paths 380 and 390. Paths that are not used, such as path 390, may be denoted as passive paths. Load sharing over multiple active paths between two service redistribution functions may also be facilitated according to exemplary embodiments.

While the network of FIG. 3 depicts only one service, additional services can be deployed in a similar fashion. A link can then be traversed by multiple services. The variable bandwidth links may influence the redistribution functions by blocking/enabling services and, in effect, forcing a redistribution of those services. Exemplary embodiments provide redistribution per service over different paths in a topology consisting not only of primary and backup paths between two nodes, but also an arbitrary number of ingress and egress points. Multiple links may exist between one set of nodes (such as between nodes 310 and 320 for example). Multiple paths may exist between a set of nodes as well.

Exemplary embodiments for achieving increased capacity and availability in networks with variable link bandwidth detect impairment in a link, communicate information about the impairment to other links and distribute the services from links with reduced bandwidth to other links having the bandwidth available for facilitating the service. Bandwidth requirement on the impaired links is throttled down to a level that can be accommodated by the reduced bandwidth.

Impairment may be detected if the link level conditions indicate a need for relocation of service with a potential gain. Potential gain refers to the ability to use at least some of the available bandwidth (that has been reduced in a degraded link) as opposed to not being able to use any of the available bandwidth.

Information about the impairment may be communicated for resolution. Signaling between nodes may be used to communicate the impairment information. The information that is communicated can include the reduced bandwidth value for example. For example, if a link is set up with 300 Mbps bandwidth and degradation leads to a bandwidth of 200 Mbps in the link, the reduced bandwidth value (i.e. 200 Mbps) can be communicated to the other nodes. The resolution may include redistributing services on the impaired links to links which have adequate bandwidth for sustaining the traffic. The changes in the network resulting from the impairment and redistribution can be communicated to the control plane or network management system.

The detection of impairment includes finding network states that could be gained by a potential redistribution of services. For variable bandwidth networks, this includes having the ability to add services for transmission to links with available bandwidth.

A link can be used by several services which may have different QoS requirements. Depending on those requirements and the pattern of the link bandwidth variation, the services can be affected in different ways. For links where the link speed varies in such a fashion that buffering alone can not contribute to service degradation, the service (that is affected by the degradation) may be redistributed to other paths through the network.

Services that can be redistributed may be enabled with impairment detection for those links where bandwidth variation is dimensioned to occur. The impairment detection may include evaluating whether the service can be sustained on the link or it has to be moved to another link. Link degradation may be detected by utilizing performance parameters for monitoring signal quality. The link capacity may be signaled back to the node from which packets are sent over the link. Performance parameters are known and are used to determine packet loss, error rate, etc.

The PHY mode of a link may be used to detect impairment and redistribution of a service. An evaluation of a buffer may also be made to determine if service redistribution is warranted (i.e. congestion may be evaluated on a link in deciding whether to redistribute a service).

There exists a potential for several services to be simultaneously impaired. In exemplary embodiments, a priority scheme may be applied to determine the order of redistribution of the impaired services. The priority may be influenced by factors such as the current link bandwidth, the QoS requirements of the services, the service requirements for bandwidth etc.

If the link improves (i.e. the bandwidth increases to previously set levels for example), an evaluation of services that could be accommodated on the link may be triggered.

The impairment detection functionality may be located in the network element attached to the variable link function where congestion detection is possible. This location may be at one or both ends of a link depending on whether symmetric or asymmetric traffic patterns are expected.

The functionality for detecting impairment may be located at a network location that is different from a network location where the impairment may be resolved (by redistributing the impacted service for example). Therefore, the detected impairment (and its scope) has to be communicated to the location of the impairment resolution. This may be accomplished by letting network elements experiencing impairment actively block or drop service path monitoring messages. Dropping or blocking service path monitoring messages can signal link impairment. Such impairment can be signaled to the service resolution functionality.

Per service path monitoring message is not limited to a particular protocol and may be implemented for Ethernet using Ethernet OAM such as CCM (Continuity Check Message) or other performance parameters as defined in ITU-T Recommendation Y.1731. Similarly, for MPLS/MPLS-TP, MPLS/MPLS-TP OAM such as Hello in BDF (bidirectional forwarding detection) as defined by the IETF can be used. Communication of impairment in this manner is interoperable to already deployed networks and network elements.

If a high-priority service is affected by link degradation, a swift redistribution has to be performed in order to avoid further degradation of the link. Load sharing on a service level may be achieved by the implementation of service redistribution according to exemplary embodiments. The service redistribution function can typically be pre-provisioned with at least two paths. The paths may be an active path 380 and a passive path 390 as illustrated in FIG. 3. The alternative paths may be pre-defined during network provisioning for example. Passive paths are not entirely unutilized. They may be used for low priority traffic when not being used as active paths.

While other alternatives (such as dynamic re-routed paths for example, etc.) may also be implemented, the time needed for establishing new paths or having multiple network elements obtain a converged network view may negatively affect the user experience beyond a tolerable level.

Network planning, control plane and/or network management systems may control how the network responds to variations in link bandwidth. Network elements detecting impairment and the network elements implementing the redistribution function are synchronized according to exemplary embodiments. Since exemplary embodiments are implemented per service, deployments having more than two network entry/exists are supported without having to synchronize additional network elements. Service re-routing may be achieved without the need for communication among the edge nodes.

During provisioning, a set of rules or conditions may be established for links. These rules may specify the action(s) to be taken in case of link degradation. The rules may, for example, specify that if bandwidth falls below a particular level in a link, then a service has to be redistributed to another link/path. The service that is to be redistributed, and the link to which it is to be redistributed, may also be specified. Rules that are specific to each node may be located at the physical layer for each node; rules for the network may be located at the control plane and/or the network management system (NMS).

Different types of services may be affected differently when, on one hand, they run on variable bandwidth links and on the other hand, they are subjected to redistribution to a new path.

Non-time critical services (best effort service) may handle variations in bandwidth better than real-time services (guaranteed service). For non-time critical services, the traffic may be buffered more extensively and since the service does not have a strict delivery deadline, a good QoE may be offered. Extensive buffering on real-time service, however, may degrade the user QoE.

For best effort traffic based predominantly on TCP (Transmission Control Protocol), if a link has been subjected to bandwidth decrease (i.e. invoked by link degradation), the link becomes the congestion point for one or several TCP flows. The link buffer may be used by the TCP AIMD (Additive Increase/Multiplicative Decrease) congestion avoidance mechanism to handle congestion and maintain a high TCP throughput. In case that the service is switched over to a different path, the contents of the buffer can be discarded. The switch and loss of packet(s) can disturb the TCP session and thus reduce the throughput compared to letting the buffer sustains the throughput.

By reacting to congestion scenarios by redistribution, TCP flows might end up in a slow start phase. Due to the exponential traffic growth during slow start of several TCP flows, disturbance may also occur on the backup path.

For TCP based traffic, with TCP being opportunistic, buffer build-up may not be an accurate indicator of service degradation. On the other hand, if proper capacity planning has been conducted, then for high-priority non-TCP based traffic, buffer build-up may be a good indication of the commencement of service degradation.

The allocation and redistribution of services in variable link bandwidth networks may redistribute real-time services before redistributing best effort services. The timing requirements for real-time services, however, are strict.

Figure 4:
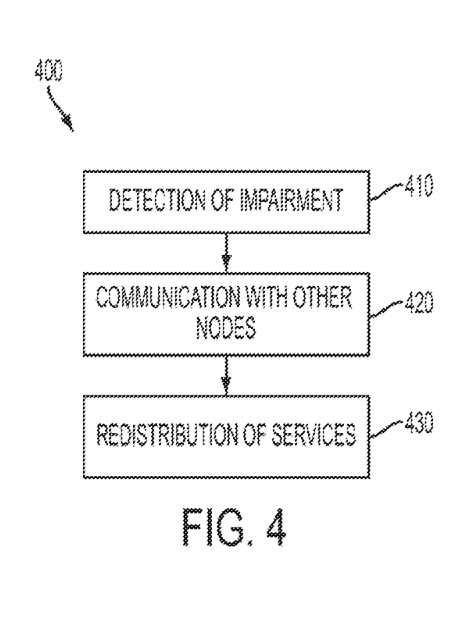
FIG. 4 illustrates a method in accordance with exemplary embodiments.

A method in accordance with exemplary embodiments is illustrated in FIG. 4. Method 400 of FIG. 4 may include impairment detection at 410, impairment communication at 420 and impairment resolution at 430. Impairment communication may include communicating the impairment to other nodes. Impairment resolution may include redistribution of services.

Figure 5:
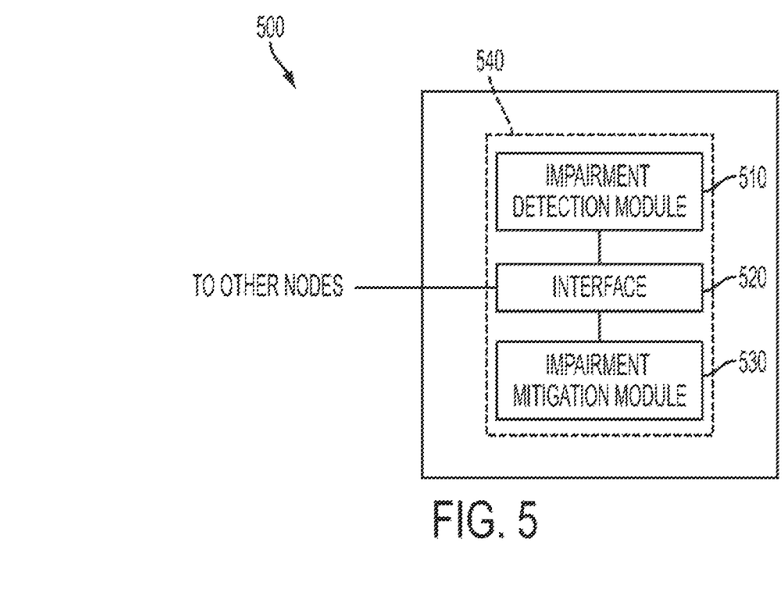
FIG. 5 illustrates a network node in accordance with exemplary embodiments.

A node in accordance with exemplary embodiments is illustrated in FIG. 5. Node 500 may include an impairment detection module 510, a communication interface 520 and impairment resolution module 530. The functionality of modules 510 and 530 was described above. The communication interface 520 communicates the impairment detection to other nodes in the network and also facilitates communication between modules 510 and 530. As a result of service redistribution that is performed module 530 to resolve an impairment, the bandwidth required by services running on the impaired link is reduced so that it does not exceed the available bandwidth.

In some embodiments, the interface 520 may be separated into two functional units, one for communication with the other nodes in the network and one for communication between the impairment detection module 510 and the impairment mitigation module 530.

Interface 520 can communicate, to the other nodes, the bandwidth available after the impairment and the services running on the link used by the node. Interface 520 can also receive, from the other nodes, information about bandwidth available on links used by the other nodes and services running on those links.

Modules 510, 520 and 530 can be implemented in one hardware block 540 or in node 500 as separate hardware modules. Traffic congestion may also be monitored on a link using a fixed or configurable threshold setting. The buffer may be monitored for example and if the information in the buffer exceeds a pre-determined threshold, some (or even all in some instances) of the traffic on that congested link can be redistributed to other links.

Exemplary embodiments as described herein may conform to any technology performing connectivity verification over a set of alternate connections/paths. Therefore, several different realizations are possible. Some examples of these realizations are highlighted below.

The method as described in exemplary embodiments may be implemented in MPLS-TP, IETF RFC 5921, with a 1:1 protection scheme using an active and a standby path. The service path may be mapped to either the transport LSP (Label Switched Path) or a PW (Pseudo Wire). Link bandwidth degradation events may then influence the MPLS-TP protection mechanisms to switch over to an alternate path.

Similarly, PBB-TE (Provider Backbone Bridge Traffic Engineering), IEEE 802.1 Qay-2009, may implement path protection through a worker path and a protect path. Mapping for PBB-TE may be similar to that of MPLS-TP.

In network configurations where BFD, IETF RFC 5880, is used to validate layer 3 IP routes, an impaired link may trigger the blocking of BFD Hellos. The traffic or service associated with that route is then forced to take an alternate path.

In an exemplary embodiment, performance parameters on microwave links may be monitored. When degradation of these links reaches a threshold that is below a required level, the traffic on these microwave links may be distributed over other transmission links.

A test signal (e.g. Section 7.7.2/Y.1731) may be used or Synthetic Frame Loss Measurement (SLM) as described in ITU-T recommendation Y.1731 to monitor the microwave links. If a determination is made that the links are degraded, the traffic may be throttled down on these links and consequently the bandwidth of these links is reduced accordingly. Link degradation may always imply activation of bandwidth reduction.

The test signal can, for example, be a pseudo-random bit sequence (PRBS) of $2^{31}-1$ or any other suitable test signal. The test signal can be mapped into the OAM PDU as defined in Y.1731 and the bit errors are monitored on the links. If the errors exceed a threshold, these links can be declared as being degraded and the bandwidth is reduced and the services that are transported on these links can be distributed on other links that are not degraded or have bandwidth available for transporting the diverted services.

Figure 6A:
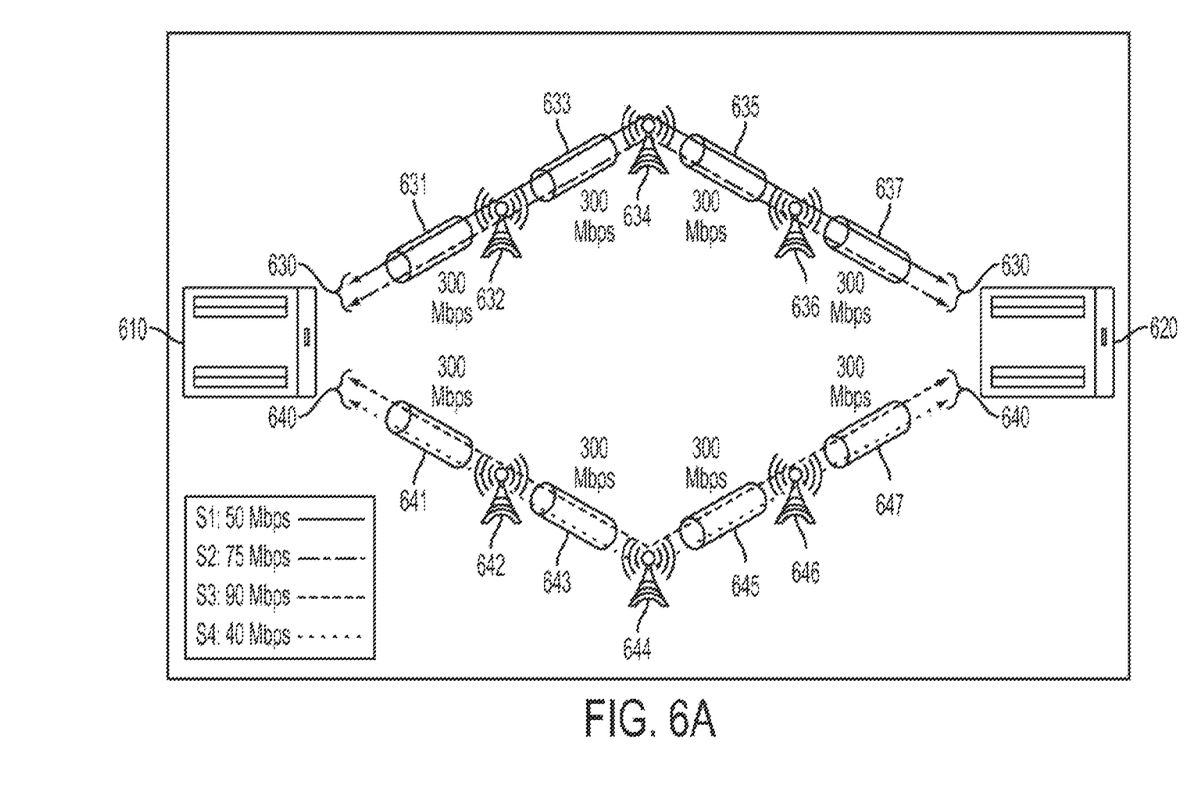
FIGS. 6(A)-6(C) illustrate a service redistribution method in accordance with exemplary embodiments.

A service redistribution method in accordance with exemplary embodiments may be described with reference to FIGS. 6(A)-6(C). A normal operating condition is illustrated in FIG. 6(A). Service paths having a 300 Mbps bandwidth may be established between nodes 610 and 620. These paths may be designated as 630 and 640. Services S1 and S2 (having a 50 and 75 Mbps requirement respectively) may be assigned to path 630 and service S2 and S4 (having 90 and 40 Mbps requirement respectively) may be assigned to path 640. S1 may be a critical service such as voice service for example. S2, S3 and S4 may be less critical services such as video services or value-added services.

The combined requirement for S1 and S2 is 125 Mbps which can be accommodated by path 630 in its normal state of 300 Mbps bandwidth. Similarly, the combined requirement for S3 and S4 of 130 Mbps can be accommodated by path 640 in its normal state of 300 Mbps bandwidth.

Service path 630 may include a plurality of tunnels 631, 633, 635 and 637 between a plurality of radio towers 632, 634 and 636 as illustrated. Each of the tunnels may have a 300 Mbps bandwidth. Similarly, service path 640 may include tunnels 641, 643, 645 and 647 having a bandwidth of 300 Mbps between radio towers 642, 644 and 646.

Figure 6B:
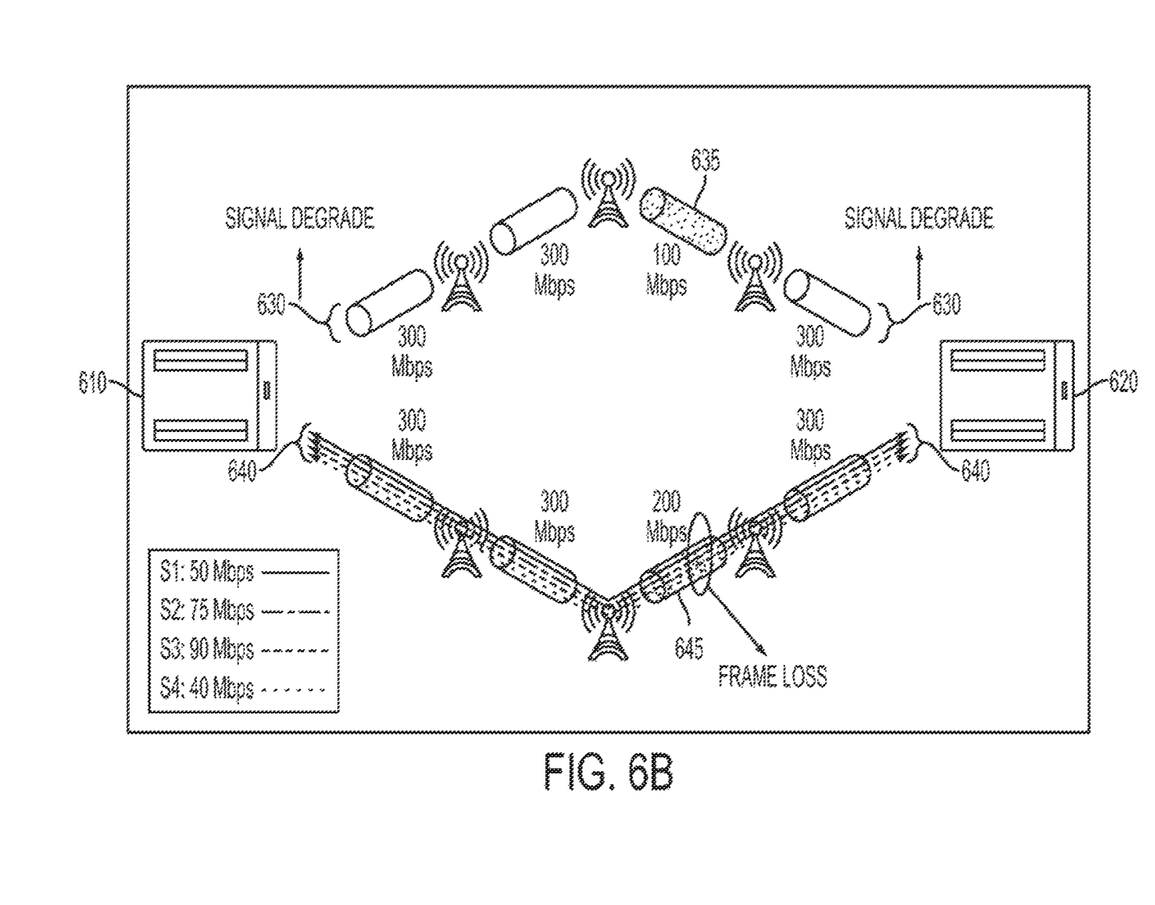
Figure 6C:
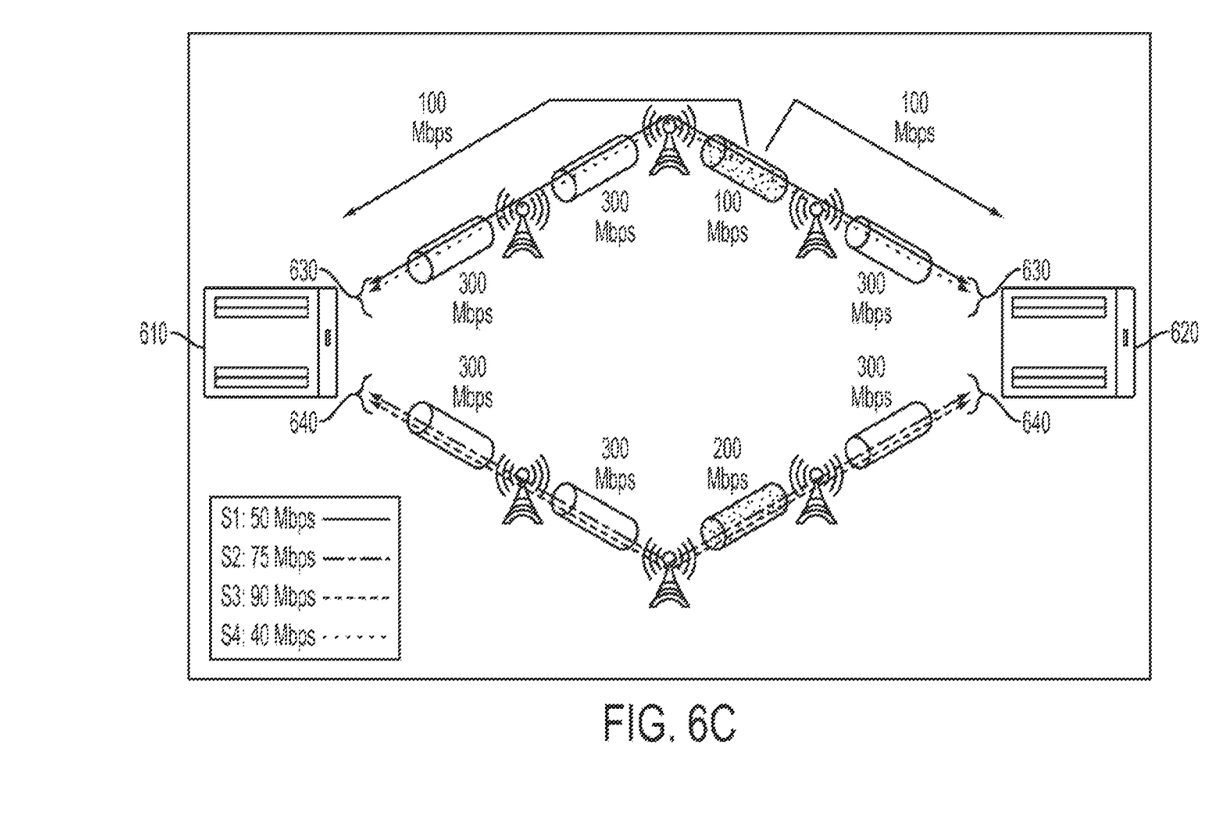

Service path 630 may experience degradation resulting in reduction to a bandwidth of 100 Mbps (in tunnel 635 in this example) and service path 640 may experience degradation resulting in reduction to a bandwidth of 200 Mbps (in tunnel 645 in this example) as illustrated in FIG. 6(B).

In this state, the combined requirements of S1 and S2 (125 Mbps) cannot be accommodated by path 630. Due to detection of high frame loss ratio (i.e. degradation) on path 630, services S1 and S2 can be switched to path 640. However, this will also lead to high frame loss ratio on path 640.

If switching does not take place, a service disruption is experienced by S1 and S2 on path 630. The combined requirements of S3 and S4 (130 Mbps) can still be accommodated by path 640.

However, path 630 could accommodate one of S1 (50 Mbps), S2 (75 Mbps), S3 (90 Mbps) and S4 (40 Mbps) since each of these require less than the available bandwidth of 100 Mbps. Path 630 could also accommodate the combined requirements of S1 (50 Mbps) and S4 (40 Mbps) since their combined requirement (90 Mbps) is less than the available bandwidth of 100 Mbps.

Path 640 with its current available bandwidth of 200 Mbps can accommodate each of the following individual and combined services: S1, S2, S3, S4, S1/S2, S1/S3, S1/S4, S2/S3, S2/S4, S3/S4, S1/S2/S4 and S1/S3/S4.

According to exemplary embodiments, the services can be redistributed. In an exemplary redistributable service allocation, as illustrated in FIG. 6, service S2 can be switched to path 640 and service S4 can be switched to path 630. In this state, services S1 and S4 are carried by path 630 and services S2 and S3 are carried by path 640.

The combined requirements of S1 and S4 (90 Mbps) can be accommodated by path 630 even in its degraded state (with 100 Mbps). Similarly, the combined requirements of S2 and S3 (165 Mbps) can be accommodated by path 640 in its degraded state (200 Mbps).

Services S1 and S2 can be grouped over one path (630) as illustrated in FIG. 6(A). Services S3 and S4 can be grouped over another path (640). That is, multiple services can be grouped for transmission over one path.

By implementing exemplary embodiments, more services can be supported by continuously using the degraded link at lower bandwidth. Some important services can maintain very high availability even during bandwidth/link degradation. This is of particular importance in microwave network applications as the bandwidth resource is limited.

Performance monitoring of the microwave links can be carried out, but not limited, by the following possible methods: (i) A test signal may be sent as defined in ITU Recommendation Y.1731 for monitoring errors and declaring the link as being degraded at various threshold values; and (ii) Synthetic Frame Loss (SLM) measurement as defined in the latest Y.1731 may be used.

In order to ensure proper functioning of the service distribution (or, redistribution) policy, a message is sent to each end of the path indicating the current maximum bandwidth that can be utilized on the path as well as communicating with intermediate points along the path. The current maximum bandwidth of the path cannot be exceeded as a result of redistributing the services. Alternatively, messages may be exchanged or sent between the endpoints of the paths and/or intermediate points along the path to negotiate the redistribution of the services on the path.

Exemplary embodiments may be implemented in ring and necklace/multi-homed networks. Implementation in an aggregation ring is described with reference to FIG. 7. Ring 700 includes nodes 710, 720, 730 and 740 (with corresponding switches 712, 722, 832 and 742) and links L1, L2, L3 and L4 between the nodes. The services traversing the ring 700 from nodes 710, 720 and 740 are aggregated into node 730.

Figure 7:
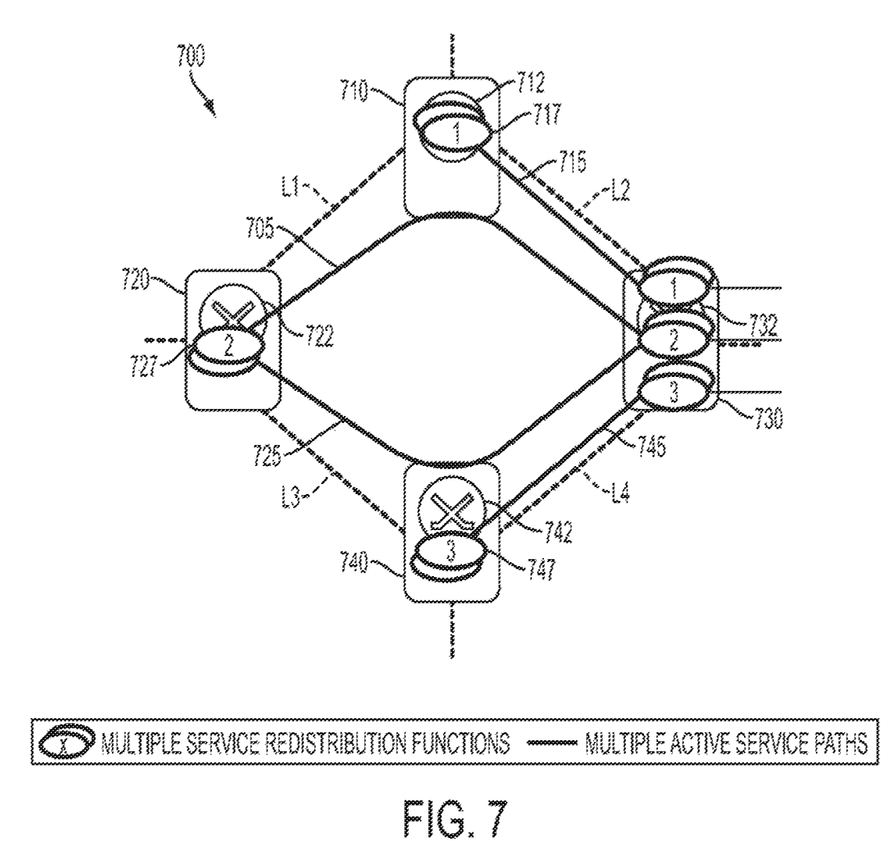
FIG. 7 illustrates a service redistribution for a ring network in accordance with exemplary embodiments.

Each of the nodes 710, 720 and 740 can have multiple service redistribution functions associated therewith. These functions are designated as 717, 727 and 747 respectively. For each of the services offered by nodes 710, 720 and 740, redistribution functions may be configured over (active) service paths 715, 705/725 and 745 to node 730. The passive paths (not illustrated) can be routed in the opposite direction of the associated active path.

Node 730 may detect impairments on paths 705 and/or 715. According to exemplary embodiments, parts of the services to nodes 710 and 720 (from node 730) traversing paths 715 and 705 may be blocked. The services can then be redistributed on the (currently) passive paths associated (in opposite direction) with paths 745, 725 and 705 from node 730 to nodes 740, 720 and 710 respectively.

Figure 8:
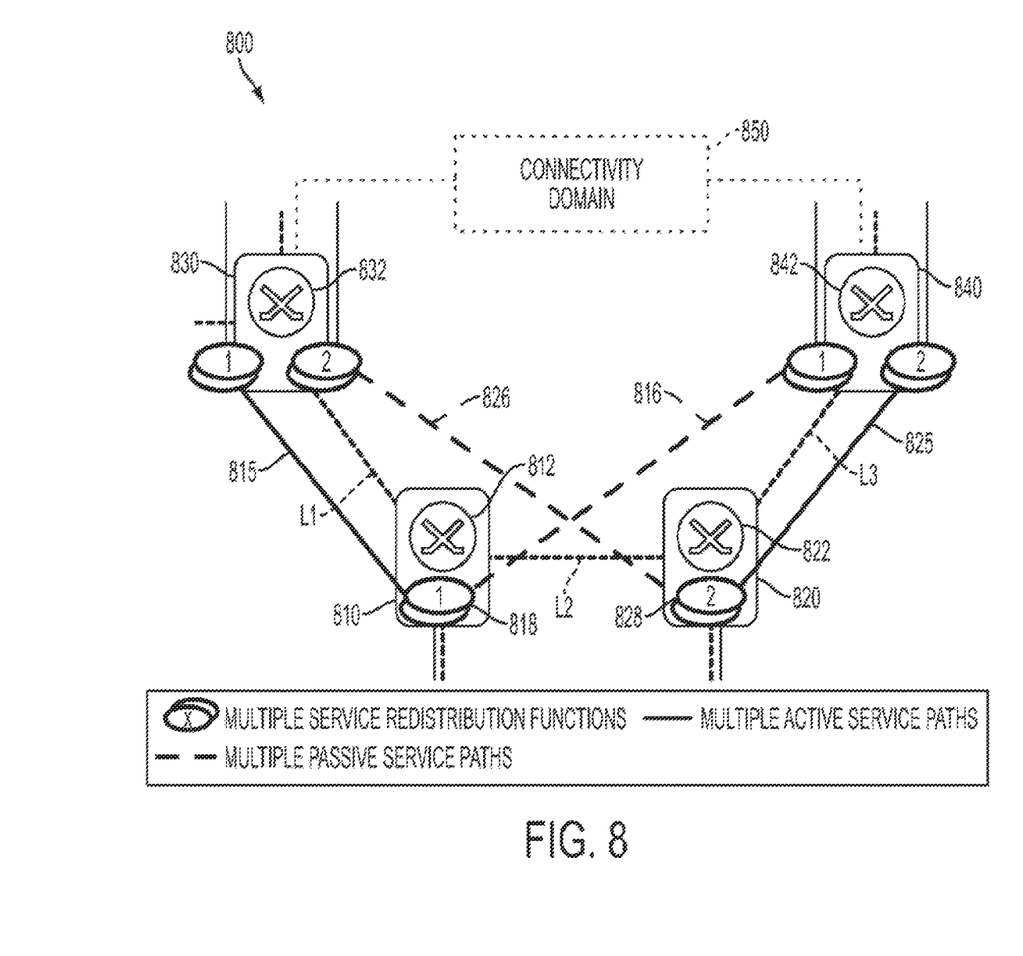
FIG. 8 illustrates a service redistribution for a necklace/multi-homed network in accordance with exemplary embodiments.

Implementation of exemplary embodiments in a necklace/multi-homed network is illustrated in FIG. 8. Network 800 includes nodes 810, 820, 830 and 840 (with corresponding switches 812, 822, 832 and 842) and links L1, L2 and L3 between the nodes. As with the aggregation ring 700 of FIG. 7, some of the nodes can have multiple service redistribution functions. In network 800, nodes 810 and 820 have multiple service redistribution functions associated therewith. These functions are designated as 818 and 828 respectively.

In network 800, there are multiple (two in this case) exit points for each service. Nodes 830 and 840 provide access to another connectivity domain 850. The service paths 815 and 825 (i.e. active service paths) are monitored to determine if they offer connectivity (i.e. adequate link capacity). This information (i.e. whether they offer connectivity) is communicated towards domain 850 from nodes 830 and 840. No direct communication path is needed between 830 and 840 to exchange information about the states of the links.

If active service path 815 between nodes 810 and 830 is degraded, then the passive service path 816 between nodes 810 and 840 is used to send service from node 810 to node 840. Similarly, if active service path 825 between nodes 820 and 840 is degraded, then the passive service path 826 between 820 and 830 is used to send service from node 820 to node 830. In any of these arrangements, it is not impossible to use one path for both services if another path is degraded as long as the non-degraded path provides the required bandwidth.

The load-sharing and redistribution functionality in the necklace network 800 is similar to that of ring network 700. The impairment signaling is performed by blocking the service paths. Therefore, the load-sharing method described with reference to network 800 does not introduce any new information that needs to be synchronized between the redistribution functions on nodes 830 and 840. Protections schemes offering one active path already have mechanisms for synchronizing the active/passive path state.

Several advantages may be realized by exemplary embodiments as described. Links can be used continuously even with degraded conditions (i.e. at a reduced bandwidth). Links can be used in microwave networks or other point to point communications. Exemplary embodiments as described for handling variable bandwidth networks can be implemented utilizing existing technologies.

Service re-routing is facilitated over complex topologies with several ingress and egress points triggered by impairment conditions on variable bandwidth links. Information about the impairment condition is communicated to a limited set of network elements and network level synchronization is not used. The response time for addressing impairment conditions is short, typically less than 50 ms. Exemplary embodiments can leverage existing technologies.

The invention has been described with reference to particular embodiments. However, it will be readily apparent to those skilled in the art that it is possible to embody the invention in specific forms other than those of the embodiment described above. The described embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. A method for adjusting bandwidth in a communications network including a plurality of nodes connected over multiple links and having a plurality of services running on the links, the method comprising the steps of:
   detecting an impairment of a link, the impairment invoking a reduction in bandwidth available to the services running on the link;
   communicating information about the impairment; and
   causing redistribution of services between the impaired link and at least one other link, wherein the redistribution comprises keeping a high priority service on the impaired link, if the impaired link can sustain the high priority service.

2. The method of claim 1, wherein the redistribution is on a per service basis.

3. The method of claim 1, wherein the redistribution further comprises switching a low priority service from the impaired link to another link.

4. The method of claim 1, wherein the redistribution of services further comprises:
   exchanging services between the impaired link and at least one additional link.

5. The method of claim 4, wherein the exchanging of services comprises:
   routing a service from the impaired link to another link and routing a service from the other link to the impaired link.

6. The method of claim 1, further comprising:
   detecting a reduction in the link impairment, the reduction resulting in the impaired link regaining its original bandwidth; and
   returning the redistributed services to their original paths.

7. The method of claim 1, further comprising:
   specifying a threshold value for a link buffer data;
   causing redistribution of at least one service from a path associated with the link if buffer data exceeds the threshold.

8. A system in a communications network, the communications network including a plurality of nodes connected over multiple links and having a plurality of services running on the links, the system comprising:
   an impairment detection module for detecting an impairment in a link used by the plurality of services, the impairment invoking a reduction in bandwidth available to the services running on the link;
   a communication interface for communicating information about the impairment; and
   an impairment resolution module for causing redistribution of services between the impaired link and at least one other link, wherein the redistribution comprises keeping a high priority service on the impaired link, if the impaired link can sustain the high priority service.

9. The system of claim 8, wherein the communication interface provides communication between the impairment detection module and the impairment resolution module.

10. The system of claim 8, wherein the communication interface communicates information on services running on the impaired link.

11. The system of claim 8, wherein the communication interface receives available bandwidth information from the nodes in the network, the available bandwidth information corresponding to links being used by the nodes.

12. The system of claim 8, wherein the impairment detection module, the communication interface and the impairment resolution module are implemented as one hardware module.

13. The system of claim 8, where each of the impairment detection module, the communication interface and the impairment resolution module are implemented as separate hardware modules.

14. A method for adjusting bandwidth in a communications network including a plurality of nodes connected over multiple links and having a plurality of services running on the links, the method comprising the steps of:
   obtaining information about a detected impairment of a link, the impairment invoking a reduction in bandwidth available to the services running on the link;
   causing redistribution of the services running on the link in response to the obtained information, the services being redistributed between the impaired link and at least one other link, wherein the redistribution comprises keeping a high priority service on the impaired link, if the impaired link can sustain the high priority service.

15. The method of claim 14, wherein the redistribution is on a per service basis.

16. The method of claim 14, wherein the redistribution further comprises switching a low priority service from the impaired link to another link.

17. A non-transitory computer-readable medium storing instructions for an impairment resolution module for a communications network, the communications network including a plurality of nodes connected over multiple links and having a plurality of services running on the links, wherein execution of the instructions by the impairment resolution module cause the impairment resolution module to:
   obtain information about an impairment in a link used by the plurality of services, the impairment invoking a reduction in bandwidth available to the services running on the link;
   cause redistribution of the services running on the link in response to the obtained information, the services being redistributed between the impaired link and at least one other link, wherein the redistribution comprises keeping a high priority service on the impaired link, if the impaired link can sustain the high priority service.

18. The non-transitory computer-readable medium of claim 17, wherein the redistribution further comprises switching a low priority service from the impaired link to another link.

19. The non-transitory computer-readable medium of claim 17, wherein the redistribution of services further comprises:
   exchanging services between the impaired link and at least one additional link.

20. The non-transitory computer-readable medium of claim 19, wherein the exchanging of services comprises:
   routing a service from the impaired link to another link and routing a service from the other link to the impaired link.

* * * * *